(12) United States Patent
Grady et al.

(10) Patent No.: US 9,396,532 B2
(45) Date of Patent: Jul. 19, 2016

(54) CELL FEATURE-BASED AUTOMATIC CIRCULATING TUMOR CELL DETECTION

(71) Applicants: Leo Grady, Millbrae, CA (US);
Ramamani Ramaraj, Dayton, NJ (US);
Sarah Schlachter, Langhorne, PA (US);
Xuan-Lan Nguyen, Issy-les Moulineaux (FR)

(72) Inventors: Leo Grady, Millbrae, CA (US);
Ramamani Ramaraj, Dayton, NJ (US);
Sarah Schlachter, Langhorne, PA (US);
Xuan-Lan Nguyen, Issy-les Moulineaux (FR)

(73) Assignee: Siemens Healthcare Diagnostics, Inc., Tarrytown, NY (US)

( * ) Notice: Subject to any disclaimer, the term of this patent is extended or adjusted under 35 U.S.C. 154(b) by 211 days.

(21) Appl. No.: 14/078,958

(22) Filed: Nov. 13, 2013

(65) Prior Publication Data

US 2014/0133733 A1 May 15, 2014

Related U.S. Application Data

(60) Provisional application No. 61/726,683, filed on Nov. 15, 2012.

(51) Int. Cl.
*G06K 9/00* (2006.01)
*G06T 7/00* (2006.01)
*G02B 21/36* (2006.01)

(52) U.S. Cl.
CPC ............ *G06T 7/0012* (2013.01); *G02B 21/365* (2013.01); *G06K 9/00147* (2013.01); *G06T 2200/24* (2013.01); *G06T 2207/10056* (2013.01); *G06T 2207/30024* (2013.01)

(58) Field of Classification Search
None
See application file for complete search history.

(56) References Cited

U.S. PATENT DOCUMENTS

| | | | | |
|---|---|---|---|---|
| 2002/0012931 A1* | 1/2002 | Waldman | ............ | A61K 31/7034 435/6.12 |
| 2003/0231791 A1* | 12/2003 | Torre-Bueno | ...... | G01N 21/6428 382/133 |
| 2005/0136549 A1* | 6/2005 | Gholap | ................ | G06K 9/0014 436/501 |
| 2005/0173633 A1* | 8/2005 | Tanaka | ............... | G01N 23/2251 250/311 |
| 2005/0181463 A1* | 8/2005 | Rao | .................. | G01N 33/54326 435/7.23 |

(Continued)

*Primary Examiner* — Vu Le
*Assistant Examiner* — Samah Beg
(74) *Attorney, Agent, or Firm* — Michele Conover

(57) ABSTRACT

An automated method for detecting circulating tumor cells in a microscopic image of a blood sample includes receiving, by a computer, a plurality of low-resolution images, each low resolution image providing a representation of the blood sample with one of a plurality of stains applied. The computer determines a threshold value for each of the plurality of stains based on the low resolution images and identifies a list of potential cells based on the threshold values. A gating process is performed on the list of potential circulating tumor cells to identify one or more likely or highly likely circulating tumor cells. The computer presents the subset of the low-resolution images in a verification interface comprising one or more components allowing a user to confirm that a respective low-resolution image included in the subset of the low-resolution images includes one or more circulating tumor cells.

12 Claims, 9 Drawing Sheets

(56) References Cited

U.S. PATENT DOCUMENTS

| | | | |
|---|---|---|---|
| 2005/0254708 A1* | 11/2005 | Jolly | G06K 9/6207 382/173 |
| 2006/0072804 A1* | 4/2006 | Watson | G06F 19/321 382/133 |
| 2007/0154960 A1* | 7/2007 | Connelly | G01N 33/5091 435/7.2 |
| 2008/0166035 A1* | 7/2008 | Qian | G06T 7/0012 382/133 |
| 2009/0191535 A1* | 7/2009 | Connelly | G01N 33/574 435/2 |
| 2009/0220955 A1* | 9/2009 | Verrant | C12Q 1/34 435/6.11 |
| 2009/0317836 A1* | 12/2009 | Kuhn | G01N 33/574 435/7.23 |
| 2010/0028915 A1* | 2/2010 | Gualberto | G01N 33/5023 435/7.23 |
| 2010/0254589 A1* | 10/2010 | Gallagher | G06K 9/0014 382/133 |
| 2012/0021435 A1* | 1/2012 | Hiltawsky | G01N 33/56966 435/7.5 |
| 2012/0076390 A1* | 3/2012 | Potts | G06T 7/0014 382/133 |
| 2012/0112098 A1* | 5/2012 | Hoyt | B82Y 30/00 250/459.1 |
| 2012/0115139 A1* | 5/2012 | Kuroda | C12Q 1/6886 435/6.11 |
| 2014/0106355 A1* | 4/2014 | Bangert | B01D 63/08 435/6.11 |
| 2014/0106388 A1* | 4/2014 | Bangert | C12Q 1/6806 435/26 |
| 2014/0112568 A1* | 4/2014 | Liu | G06T 7/0014 382/133 |
| 2014/0134998 A1* | 5/2014 | Wang | H04W 24/06 455/425 |
| 2014/0142863 A1* | 5/2014 | Ayati | A61B 5/4504 702/19 |
| 2014/0185891 A1* | 7/2014 | Schoenmeyer | G06T 7/0012 382/128 |
| 2014/0329917 A1* | 11/2014 | Marienfeld | B01L 3/508 514/789 |
| 2015/0317537 A1* | 11/2015 | Jain | G06K 9/52 382/128 |

* cited by examiner

CELL FEATURE-BASED AUTOMATIC CIRCULATING TUMOR CELL DETECTION

CROSS-REFERENCE TO RELATED APPLICATIONS

This application claims priority to U.S. provisional application Ser. No. 61/726,683 filed Nov. 15, 2012 which is incorporated herein by reference in its entirety.

TECHNICAL FIELD

The present disclosure relates generally to methods, systems, and apparatuses for automatically detecting circulating tumor cells (CTCs) using a cell feature-based analysis. The disclosed methods, systems, and apparatuses may be applied, for example, detect CTCs using a variety of cell features and staining protocols.

BACKGROUND

Circulating tumor cells (CTCs) are cancer cells that have shed from a primary tumor and circulate in the bloodstream. These cells are of vital interest to the treatment of cancer because they can result in the spread of cancer which would otherwise be localized to a single region of the body. More specifically, CTCs can become embedded in a region of the body and grow one or more secondary tumors away from region the primary tumor. The effective treatment of cancer and patient prognosis depends heavily on clinicians' ability to detect and treat CTCs. However, CTCs are difficult to detect due because they are greatly outnumbered by blood cells in an individual's blood stream.

Although several conventional systems for CTC detection exist, these systems are typically inefficient because they require a user to manually perform many, if not all, of the steps involved in the detection process. Consequently, conventional systems do not provide for quick data processing or high throughput rates. Thus, it is desired to design an automated CTC detection system which addresses these and other deficiencies found in the conventional CTC detection systems.

SUMMARY

Embodiments of the present invention address and overcome one or more of the above shortcomings and drawbacks, by providing methods, systems, and apparatuses for automatically detecting circulating tumor cells (CTCs) using a cell feature based analysis. This technology is particularly well-suited for, but by no means limited to, detecting CTCs using CD45, DAPI, and CK staining protocols.

Embodiments of the present invention are directed to an automated method for detecting CTCs in a microscopic image of a blood sample. The method includes a computer receiving a plurality of low-resolution images, each low resolution image providing a representation of the blood sample with one of a plurality of stains applied. Next, the computer determines a threshold value for each of the plurality of stains based on the low resolution images and identifies a list of potential cells based on the threshold values. Then, the computer performs a gating process on the list of potential circulating tumor cells to identify one or more likely or highly likely circulating tumor cells. The computer may present the subset of the low-resolution images in a verification interface comprising one or more components allowing a user to confirm that a respective low-resolution image included in the subset of the low-resolution images includes one or more CTCs.

In some embodiments of the present invention, the aforementioned automated method for detecting CTCs may include additional features. For example, in one embodiment, the method further includes identifying, by the computer, user-confirmed low-resolution images via the verification interface. The coordinates associated with the user-confirmed low-resolution images may then be transferred to a microscope and, in response, the computer may receive one or more high resolution images acquired at the coordinates. The high resolution images may then be presented in a new verification interface. In one embodiment the new verification interface comprises one or more new components allowing the user to confirm that a respective high-resolution image included in the presented high-resolution images includes one or more CTCs.

Various techniques may be applied in embodiments of the present invention to process the tiles into images. For example, in some embodiments, receiving the plurality of low-resolution images in the aforementioned method includes the computer receiving low-resolution image tiles from a microscope, each low-resolution image tile providing a tile representation of the blood sample with one of the plurality of stains applied. Then, the computer combines the plurality of low resolution image tiles to create the plurality of low resolution images. As an additional example, in some embodiments, receiving the one or more high-resolution images includes the computer receiving high-resolution image tiles from the microscope, each high-resolution image tile providing a tile representation of the blood sample with one of the plurality of stains applied. Then, the computer selects a region of interest from each of the plurality of high-resolution image tiles based on the coordinates to create high-resolution images.

In some embodiments, determining the threshold value for each of the plurality of stains based on the low resolution images includes creating a histogram of intensity values for each low resolution image and automatically selecting pixels within a predetermined percentile of the histogram as thresholded values. For example, in one embodiment, the predetermined percentile is two percent. In some embodiments, the computer may adjust one or more of the thresholded values based on user input.

The gating process used in the aforementioned automated method for detecting circulating tumor cells may vary across different embodiments of the present invention. For example, in one embodiment, the gating process includes determining a circularity value for each potential CTC and, for each potential circulating tumor cell, determining a median response for each of the plurality of staining channels. Next, a score for each potential CTC is determined based on its respective circularity value and respective median responses for each of the plurality of stains. Then, the one or more likely or highly likely CTCs are identified from the potential CTCs based, for example, on the determined scores.

Other embodiments of the present invention are directed to a computer-implemented method for detecting CTC in a blood sample. The method includes receiving, by a computer, a plurality of images, each image providing a representation of the blood sample with one of a plurality of stains applied. Then, the computer determines a threshold value for each of the plurality of stains applied to the blood sample and identifies a list of potential CTCs in the images. Next, the computer creates a composite mask image using the images and the threshold values, determines connected components included in the composite mask image, and applies a filter to the connected components to yield filtered components. A subset of the filtered components is selected from the filtered components and the computer applies a heuristic to identify likely or highly likely CTCs from the subset of filtered components. In some embodiments, the heuristic is based on first measurement values corresponding to the plurality of stains applied to the blood sample and a second measurement value corresponding to circularity of each of the subset of connected components. In other embodiments, different heuristics may be utilized.

The above method for detecting CTCs in a blood sample may be modified and/or supplemented by the addition of various features. For example, in some embodiments, the filter used in the method is a micrometer range filter configured filter connected components that are not within a predetermined range. This predetermined range may be, for example, 25 square micrometers to 13,500 square micrometers. In some embodiments, selecting the subset of the filtered components from the filtered components includes the computer sorting the filtered components based on criteria related to the staining values to yield sorted filtered components and selecting a predetermined number of top sorted filtered components as the subset of filtered components. The filtered components may be sorted, for example, based on a ratio of mean CK to CD45. In one embodiment, the predetermined number of top sorted filtered components is 50,000.

Embodiments of the present invention are also directed to a system for detecting circulating tumor cells in a blood sample. The system may include, for example, a storage medium, a detection processor, and a display. The storage medium is configured to store a plurality of low-resolution images, each low resolution image providing a representation of the blood sample with one of a plurality of stains applied. The detection processor is operably coupled to the storage medium and configured to determine a threshold value for each of the plurality of stains based on the low resolution images; identify a list of potential cells based on the threshold values; and perform a gating process on the list of potential circulating tumor cells to identify one or more likely or highly likely CTCs. The display is configured to present the subset of the low-resolution images in a verification interface comprising one or more components allowing a user to confirm that a respective low-resolution image included in the subset of the low-resolution images includes one or more CTCs. In some embodiments, the system may also include a microscope configured to acquire the plurality of low-resolution images.

According to some embodiments, the components of the above system may include additional functionality. For example, in some embodiments, the detection processor is further configured to identify user-confirmed low-resolution images via the verification interface; transfer coordinates associated with the user-confirmed low-resolution images to a microscope; and receive one or more high resolution images acquired at the coordinates. In some embodiments, the display is further configured to present the high resolution images in a reconfirmation interface.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings.

For the purpose of illustrating the invention, there is shown in the drawings embodiments that are presently preferred, it being understood, however, that the invention is not limited to the specific instrumentalities disclosed. Included in the drawings are the following figures.

DETAILED DESCRIPTION

The following disclosure describes the present invention according to several embodiments directed at methods, systems, and apparatuses for automatically detecting circulating tumor cells (CTCs) using feature-based analysis. In some embodiments, a user interface is provided which allows the user to, for example, adjust various thresholds associated with the featured-based analysis and manually annotate cells as being potential CTCs. The techniques described herein are efficient, allowing for quick data processing and throughput rates. In addition, embodiments of the present invention are scalable, for example, to multiple labs allowing for high throughput. Moreover, in some embodiments, to support data aggregation and cross validate analytics, the techniques collect manageable information on a central server.

Figure 1:
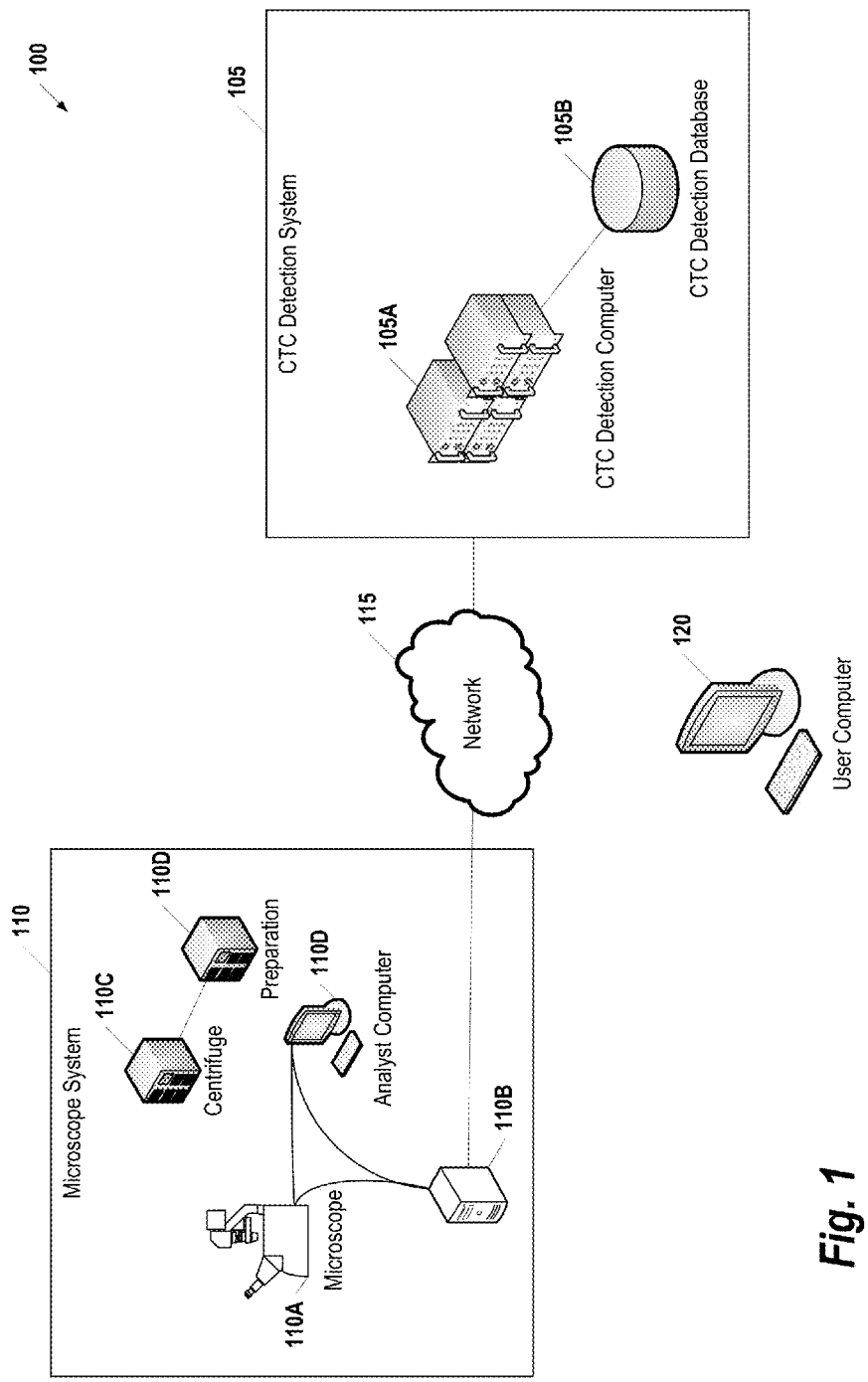
FIG. 1 provides an illustration of a CTC Detection System and related components, used in some embodiments of the present invention.

FIG. 1 provides an illustration of a CTC Detection System 105 and related components, used in some embodiments of the present invention. In the example of FIG. 1, these components include Microscope System 110 operably coupled to the CTC Detection System 105 over a network 115. At a clinical site, blood is sampled and placed in a tube with an added preserved such as, for example an ethylenediaminetetraacetic acid (EDTA) tube. The clinical site where the sampling occurs could be the same as the location of the Microscope System 110 or, alternatively, the blood sample may be collected at a remote site and transferred to the site where the Microscope System 110 is located. Once collected, the sample is centrifuged via centrifuge 110C and placed in preparation system 110D. Then, the preparation system 110D applies a staining process to the sample. In some embodiments, the stains applied include a nuclear stain such as DAPI (4',6-diamidino-2-phenylindol), a fluorescent antibody conjugate against CD45 (leukocyte marker), and one or more cytokeratins (CKs). Once the stains are applied, microscope 110A scans the sample to produce images of the nuclear, cytokeratin, and CD45 stains. In some embodiments, the microscope 110A is combined with additional fluorescence imaging components (not shown in FIG. 1). An Analyst Computer 110D allows an analyst to perform tasks such as, for example, configuring the microscope 110A or adjust various scanning parameters. These images captured by microscope 110A are then transferred to a computer 110B (e.g., workstation) for storage and/or transfer over a computer network 115 to the CTC Detection System 105. It should be noted that, while the networking computer 110B illustrated in FIG. 1 is external to the microscope 110A, in some embodiments the microscope 110A has integrated networking capabilities that allow for direct or indirect connection with the network 115 without passing through an intermediary computer such as networking computer 110B. For example, in one embodiment, the microscope is connected directly to a workstation at the lab which is then connected to the CTC Detection System 105 via one or more networks (e.g., network 115).

Continuing with reference to FIG. 1, the computer network 115 connecting the computer 110B with the CTC Detection System 105 may be implemented with a variety of hardware platforms. For example, the computer network 115 may be implemented using the IEEE 802.3 (Ethernet) or IEEE 802.11 (wireless) networking technologies, either separately or in combination. In addition, the computer network 115 may be implemented with a variety of communication tools including, for example, TCP/IP suite of protocols. In some embodiments, the computer network 115 is the Internet. A virtual private network (VPN) may be used to extend a private network across the computer network 125. In some embodiments, the computer network 115 comprises a direct connection between the computer 110B with the CTC Detection System 105 implemented using a protocol such as, for example, Universal Serial Bus (USB) or FireWire.

The CTC Detection System 105 illustrated in FIG. 1 includes a CTC Detection Computer 105A and a CTC Detection Database 105B. The Detection Computer 105A may be implemented, for example, using an application server or a computer (see, e.g., FIG. 9). In the example of FIG. 1, data generated by the CTC Detection Computer 105A is stored in a CTC Detection Database 105A. This database 105A may also be used to store any data items which the CTC Detection Database 105A uses during processing. In embodiments such as the one illustrated in FIG. 1, a User Computer can communicate with the CTC Detection Computer 105A over Network 115. For example, in one embodiment, the CTC Detection Computer 105A is implemented on an application server computer hosting a web application which provides access to the User Computer 120 via a web browser. Using its connection to the CTC Detection Computer 105, the User Computer 120 view or modify results generated by the CTC Detection Computer 105A, as well as create or modify settings used by the CTC Detection Computer 105A during the processing or post-processing of results.

Figure 2:
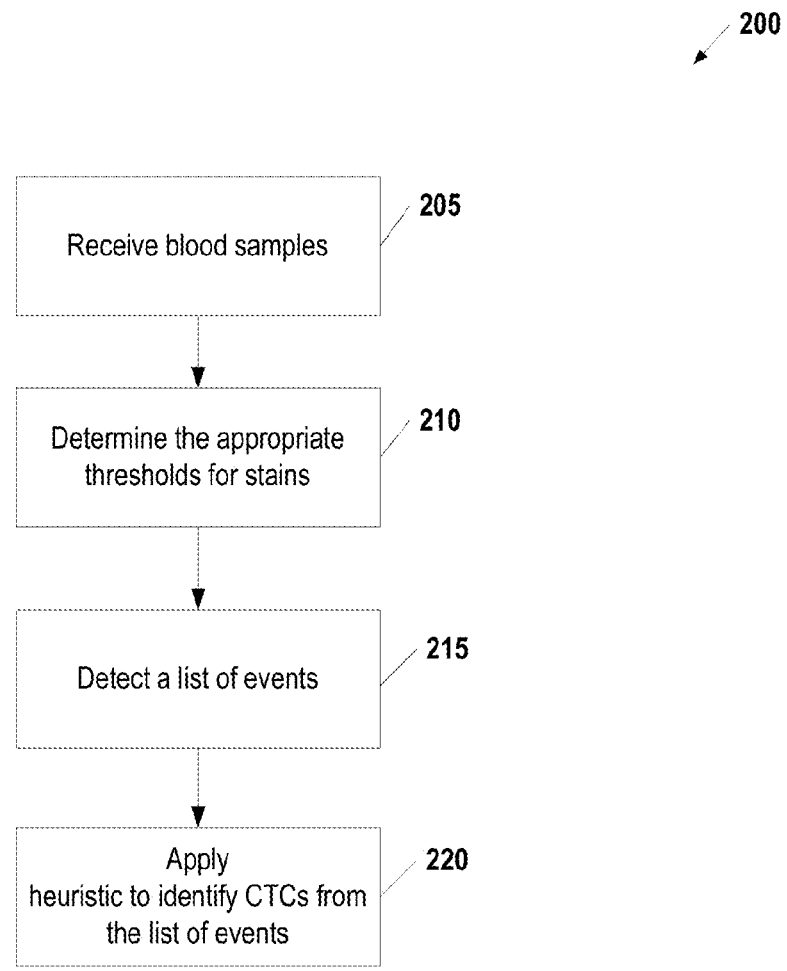
FIG. 2 provides a general overview of an automatic CTC detection process, according to some embodiments of the present invention.

FIG. 2 provides a high-level overview of an automatic CTC detection process 200, according to some embodiments of the present invention. At 205, blood sample images are received by the CTC Detection Computer 105A. These images may be acquired, for example, by a clinical microscope (e.g., 110A in FIG. 1). As is understood in the art, a clinical microscope acquires images of a sample by scanning a particular region of the sample, as defined by a plurality of coordinates. Typically, one image is received per staining channel (i.e., per staining protocol applied to the sample). For example, in one embodiment, three staining protocols are used: DAPI, CD45, and CK. In this embodiment, three images may be received for each region of the sample, each image corresponding to one of three staining protocols. In some embodiments, the images are acquired as a series of tiles, each tile representing a portion of the total image. Then, at 205, the CTC Detection Computer 105A receives the tiles and "stitches" (i.e., combines) the tiles to create a full blood sample image for each staining channel. The image tiles can be stitched together using any technique known in the art. In some embodiments, commercial software may be used for performing the stitching. In other embodiments, customized software may be developed and used to perform the stitching process.

Next, at 210, the blood sample images are processed to find the appropriate thresholds for each staining channel. In some embodiments, a histogram of intensity values is created for each image and the pixels within a predetermined percentile of the histogram are selected as candidates for threshold pixels. For example, in one embodiment, the predetermined percentile is the top two percentile. In some embodiments, if the user believes that the automatic thresholding did not provide optimal results, the user can adjust the threshold manually before finalizing the threshold. For example, in one embodiment, a graphical user interface is presented which allows the user adjust the threshold using a visual component such as a slider.

Continuing with reference to FIG. 2, at 215, the thresholds are used to automatically detect a list of "events" and filter out noise. Each event includes a group of pixels that exceed the thresholds and, thus, are considered to be potential cells. At 220, an auto-gating process is performed wherein a heuristic is applied to the list of events to identify CTCs from the list of events. In some embodiments, this heuristic is based on staining features such as, without limitation, high CK, Low CD 45, the presence of DAPI, and geometric features such as circularity.

Figure 3:
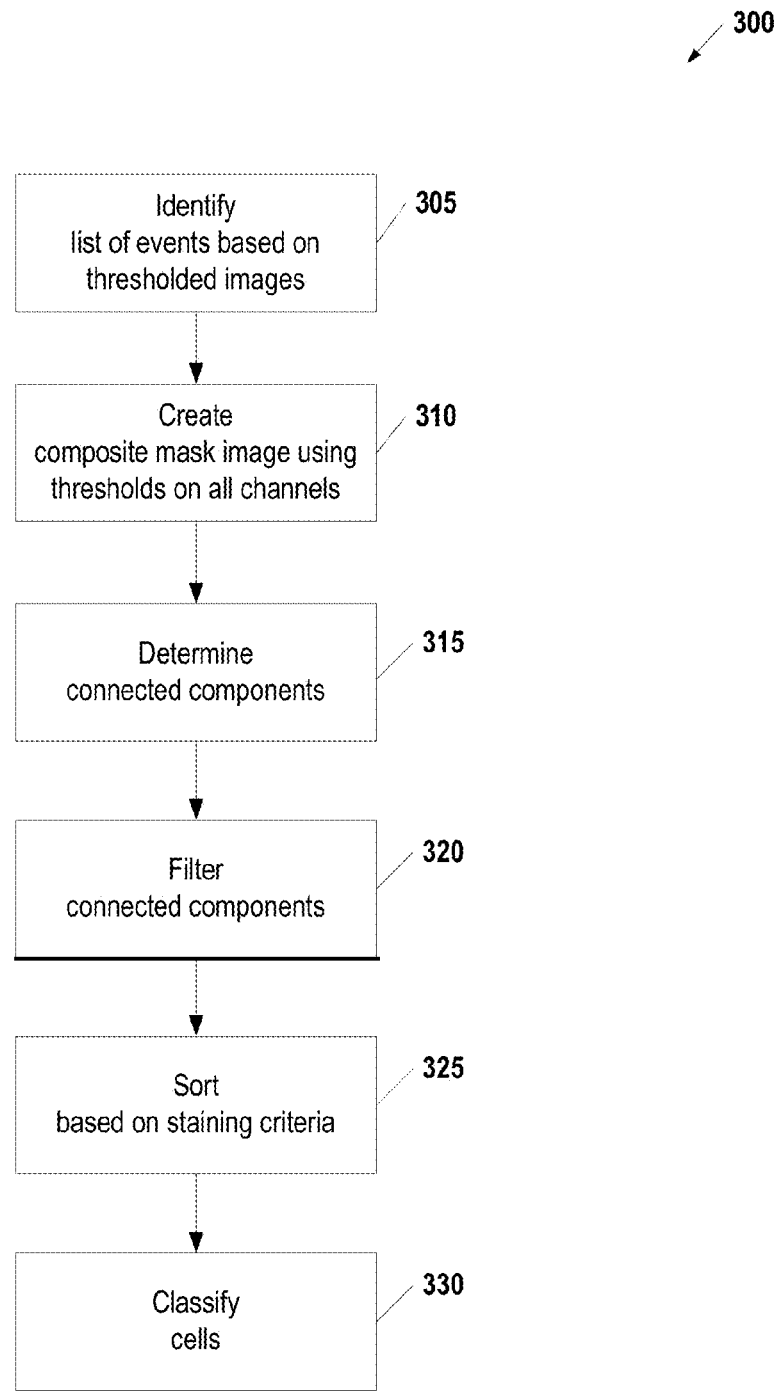
FIG. 3 provides a flowchart illustrating the cell detection step used by CTC detection process, according to some embodiments of the present invention.

FIG. 3 provides a flowchart 300 illustrating additional detail on an event detection process, as used by a CTC detection process, according to some embodiments of the present invention. At 305, a list of events is identified based on the thresholded images, for example based pixel values as describe above with respect to 215 in FIG. 2. Then, at 310, a composite mask image is created using the thresholds on all the channels, for example, using any conventional technique known in the art. At 315, the connected components on the mask image are determined. Then, at 320, a micrometer range filter is applied to filter connected components that are in not in a predetermined range. For example, in some embodiments, this predetermined range is 25 to 15*900 square micrometers. At 325, connected components that pass the micrometer range filter are sorted based on criteria related to the staining values. For example, in one embodiment, the components are sorted based on the ratio of mean CK to CD45. Once sorted, at 330, a predetermined number of top connected components are classified as cells. For example, in one embodiment, the top 50,000 connected components are classified as cells.

Figure 4:
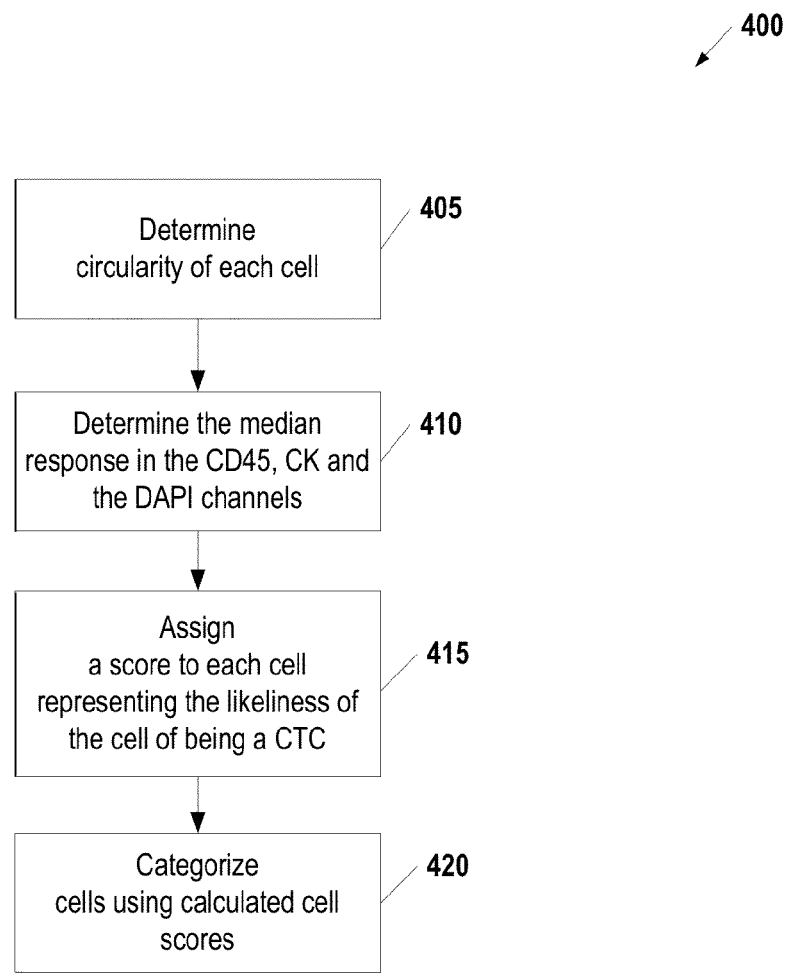
FIG. 4 illustrates a process for auto-gating classified CTCs, according to some embodiments of the present invention.

FIG. 4 illustrates a process 400 for auto-gating classified CTCs, according to some embodiments of the present invention. This process 400 is one example of how the auto-gating process briefly described above at 220 (see FIG. 2) may be implemented. First, at 405, the circularity of each cell is determined, for example, based on the width, the height and the area of the cell. Next, at 410, the median response in the CD45, CK and the DAPI channels are determined. These values are referred to herein as $CD45_{median\_response}$, $CK_{median\_response}$, and $DAPI_{median\_response}$, respectively. In some embodiments, the normalized median value of the cell is used to determine these values. For example, for DAPI, the median DAPI response of each event in the whole sample may be summed and divided by the number of events to yield the average DAPI median response. Then, to get the normalized median value of a specific cell, the median value of the cell is divided by the average DAPI median response.

Continuing with reference to FIG. 4, at 415, a score is assigned to each event representing the likelihood of the event of being a CTC. The cell score may be computed in a variety of ways which combine the features of interest. For example, in some embodiments, a CTC is defined as an event which is circular and which presents a high DAPI response, a high CK response and a low CD45 response. The circularity and the presence of a DAPI response assure that the event is a cell, while a high CK response and a low CD45 response are specific to a tumor cell. The cell score may then be computed by combining these features in a formula such as the following:

$$\text{Cell\_score} = \frac{DAPI_{median\_response} \times CK_{median\_response} \times \text{Circularity}}{CD45_{median\_response}}$$

It should be noted that this formula is one example of calculation of cell score. In other embodiments, where the features used in the classification of the CTC vary, alternative formulas for cell score may be used.

At 420, using the calculated cell scores, the events are categorized according to various criteria. In one embodiment, one of four categories is selected based on the cell score: highly likely to be a CTC, likely to be a CTC, inconclusive, and unlikely to be a CTC. For example, in one embodiment, the categories are based on a range of cell scores from 1 to 4. If the cell score is above 4 it may be determined to be highly likely to be a CTC. Conversely, if the cell score value is below 1 the cell is determined to be unlikely to be a CTC. Between these two extremes, if the cell score is between 2.5 and 4, then the cell is determined to be likely to be a CTC. However, if the cell score is between 1 and 2.5, the results are deemed inconclusive. It should be noted that this is only one example of a range of values that may be applied to select the categories based on the cell score. In other embodiments, different values may be used and the ranges cell scores corresponding to each category may be expanded or contracted. Such variation may be based on, for example, experimental results related to the particular cell score formula utilized or with regard to the success or failure of an existing categorization scheme compared to experimental results.

Figure 5:
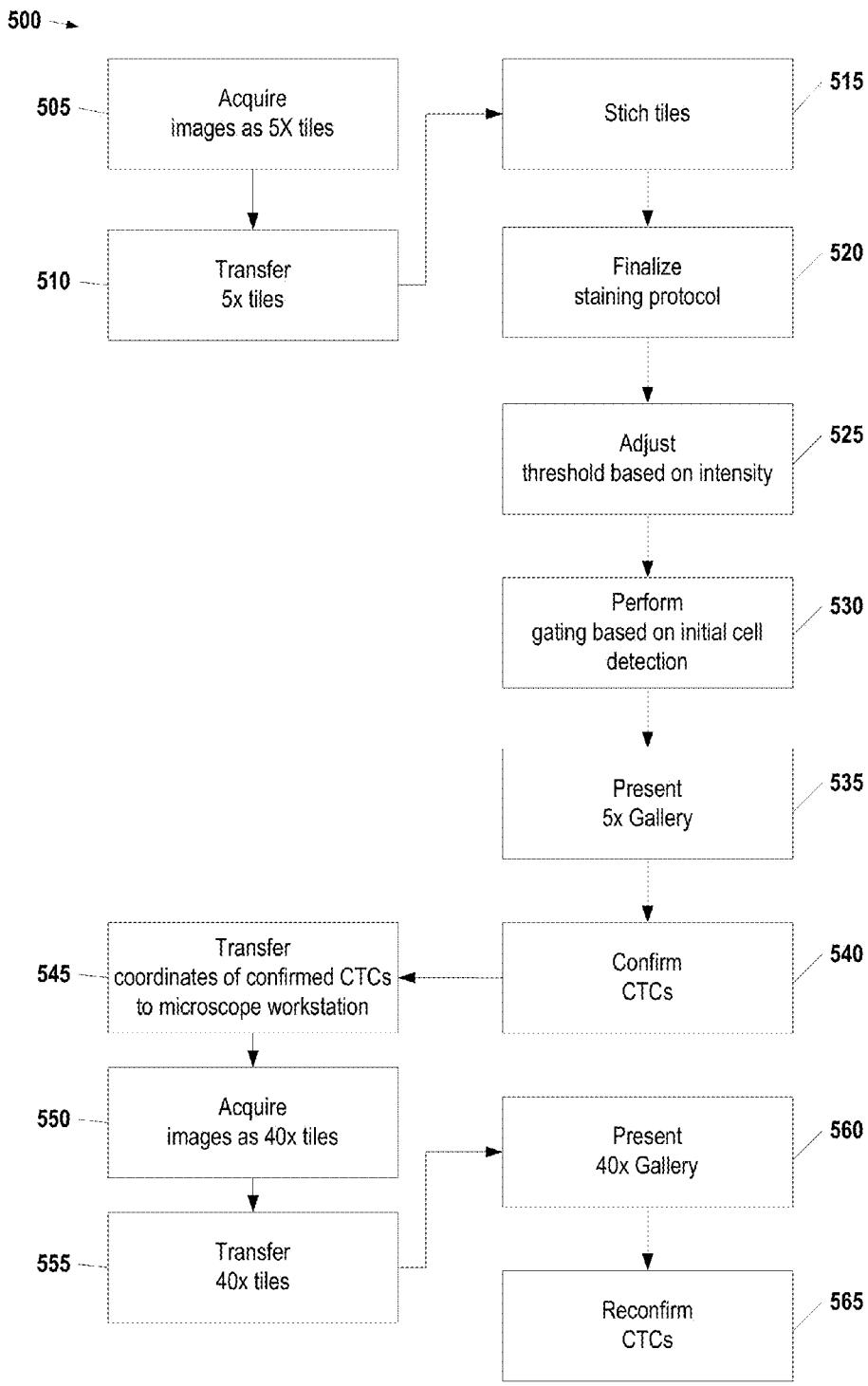
FIG. 5 illustrates a process of detecting CTC, according to some embodiments of the present invention.

The various techniques described above in FIGS. 2-4 can be further refined, for example, to provide for better computational efficiency or to allow for user interaction in the CTC detection process. For example, FIG. 5 illustrates a process 500 of detecting CTCs performed with lower resolution images before confirming the results with higher resolution images, according to some embodiments of the present invention. At 505, image tiles are acquired at 5× resolution using, for example, microscope 110A. These image tiles provide overlapping portions of the total image captured by the microscope 110A. At 510, these image tiles are then transferred to the CTC Detection System 105 and, at 515, the image tiles are stitched together to form one or more images. As is well understood in the art, stitching refers to the process of combining multiple tiles with overlapping fields of view to produce a high-resolution image. The technique used at 515 to perform the stitching may include any general technique known in the art which allows the combination of tiles. For example, in some embodiments, a dedicated software program is used to perform the stitching. Once the images are combined, the staining protocol is finalized at 520 by identifying which stains were applied to the acquired images. Next, at 525, the thresholds of each stain are automatically adjusted based, for example, on their respective intensity in the image. The thresholds may optionally be manually adjusted further by a user (e.g., via User Computer 120). Once the thresholds are set, at 530, auto-gating is performed at 530 based on the initial cell detection. Then, at 535, a gallery of images at 5× resolution is presented to a user, for example, via a graphical user interface (referred to herein as a "verification interface") on User Computer 120. The user may then confirm CTCs at 540 by interacting with the graphical user interface. For example, in one embodiment, the user clicks a checkbox next to each 5× image that the user believes includes a CTC.

Continuing with reference to FIG. 5, at 545 the coordinates of the CTCs confirmed at 540 are transferred to a microscope workstation (e.g. including microscope 110A). The microscope then acquires new image tiles at higher resolutions (e.g., 40× resolution). At 555, the new image tiles are transferred to the CTC Detection System 105. Then, the relevant portion of each 40× tile may be cut out (e.g., using a cropping technique) to create 40× resolution images of the areas of interest. Then, at 560, a gallery of 40× resolution images is presented to the user via the graphical user interface (referred to herein as a "new verification interface" or "confirmation interface"). In some embodiments, the interface presented at 560 is similar to the interface presented at 535. In other embodiments, the interface presented at 560 includes design features or other components which are distinct from those presented in the interface at 535. Finally, at 565 the user may reconfirm the CTCs in each image via interaction with the user interface (e.g., clicking a checkbox).

Once CTCs have been confirmed, the results may be stored locally or remotely. For example, in one embodiment, the images with confirmed CTCs are stored in the CTC Detection Database 105B. The confirmed CTC results may also be used transferred to a clinician or other medical personnel, for example, for presentation in an electronic medical record associated with the individual that was the source of the analyzed blood sample.

The CTC detection process described herein may be adapted to a web application for semi-automatic detection of CTC. In some embodiments, this web application comprises a series of interfaces, each corresponding to one or more steps in the automatic CTC detection process described herein. The user may utilize these interfaces, for example, to adjust one or more values corresponding to the respective step.

Figure 6:
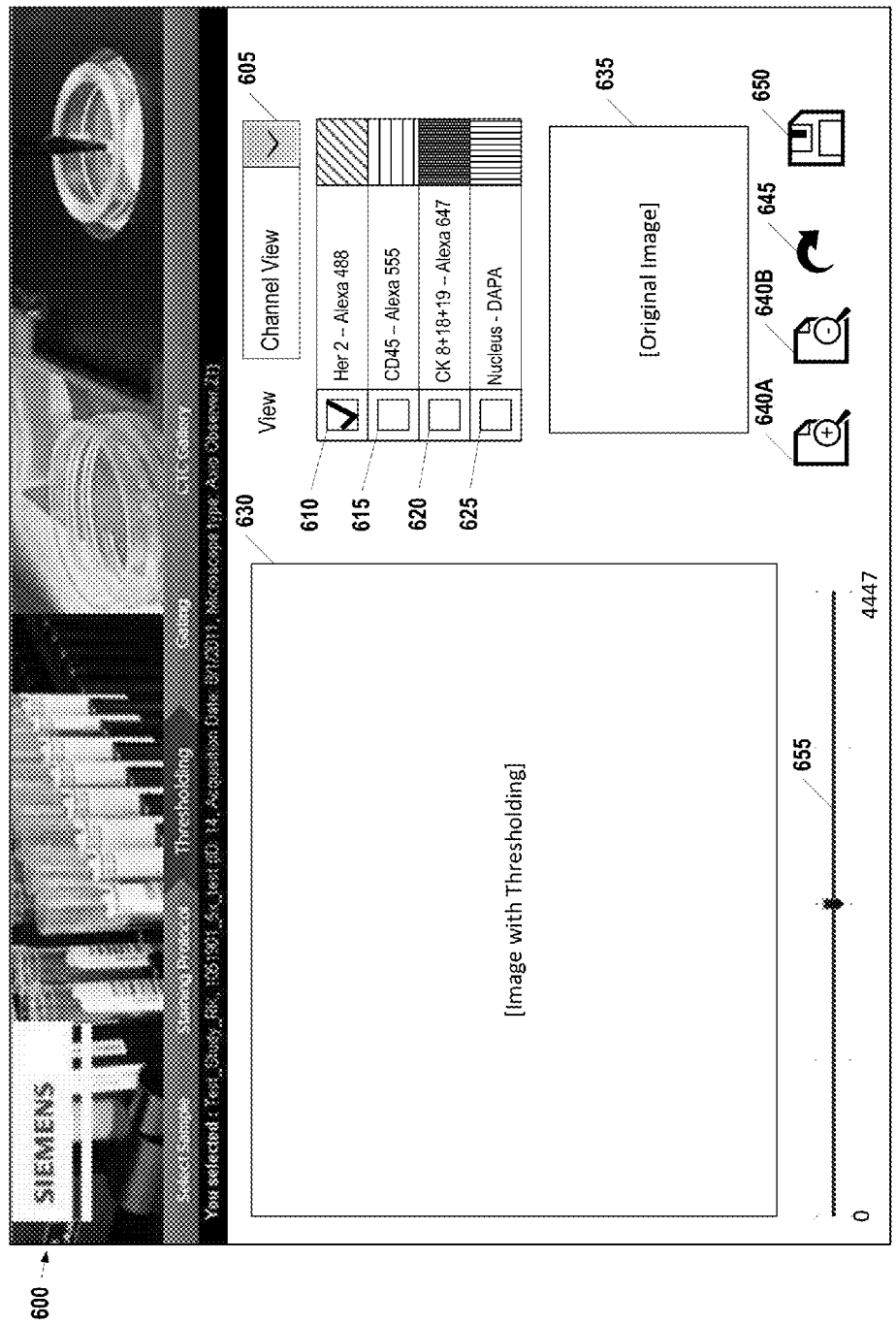
FIG. 6 is an illustration of an interface corresponding to a thresholding step, according to some embodiments of the present invention.

FIG. 6 is an illustration of an interface 600 corresponding to a thresholding step, according to some embodiments of the present invention. The interface 600 includes a dropdown list 605 allowing the user to select from a variety of views for displaying event images. For example, in FIG. 6, the "Channel View" has been selected by dropdown 605. This allows the user to view a particular image according to the various staining protocols used on the image. Checkboxes 610, 615, 620, 625 allow the user to select whether to display a particular staining protocol. In the example of FIG. 6, the user has selected the Her 2 staining protocol via checkbox 610. This, in turn, will cause the image with the Her 2 staining protocol applied to be displayed in the image placeholder 630. In some embodiments, the user is able to select multiple checkboxes simultaneously. This causes the images associated with the corresponding staining protocols to be overlaid in image placeholder 630. A slider 655 allows the user to increase or decrease the threshold values associated the displayed channel (see, e.g., 525 in FIG. 5). In FIG. 6, an original image placeholder 635 displays the image without the thresholding applied, thus allowing the user to track the effect of increasing or decreasing a particular threshold. Additional interface components may also be included to aid the user in the selection and modification of channel thresholds. In the example of FIG. 6, these interface components include a component for zooming in on an image 640A and a component for zooming out of an image 640B. In some embodiments, the interface also includes an interface component which allows the user to select a particular portion of the image for zooming in or out (not shown in FIG. 6). FIG. 6 also includes an advance component 645 which allows the user to advance to the next stage in the CTC Detection process (e.g., gating). In some embodiments, any thresholds applied by the user in the interface 600 are automatically saved for use in the remainder of the process. In other embodiments, the user must click a save component 650 on the interface to save the values before advancing to the next step in the process. In some embodiments, the save component 650 may provide additional functionality such as, for example, allowing the user to save an image which particular channel thresholds applied.

Figure 7:
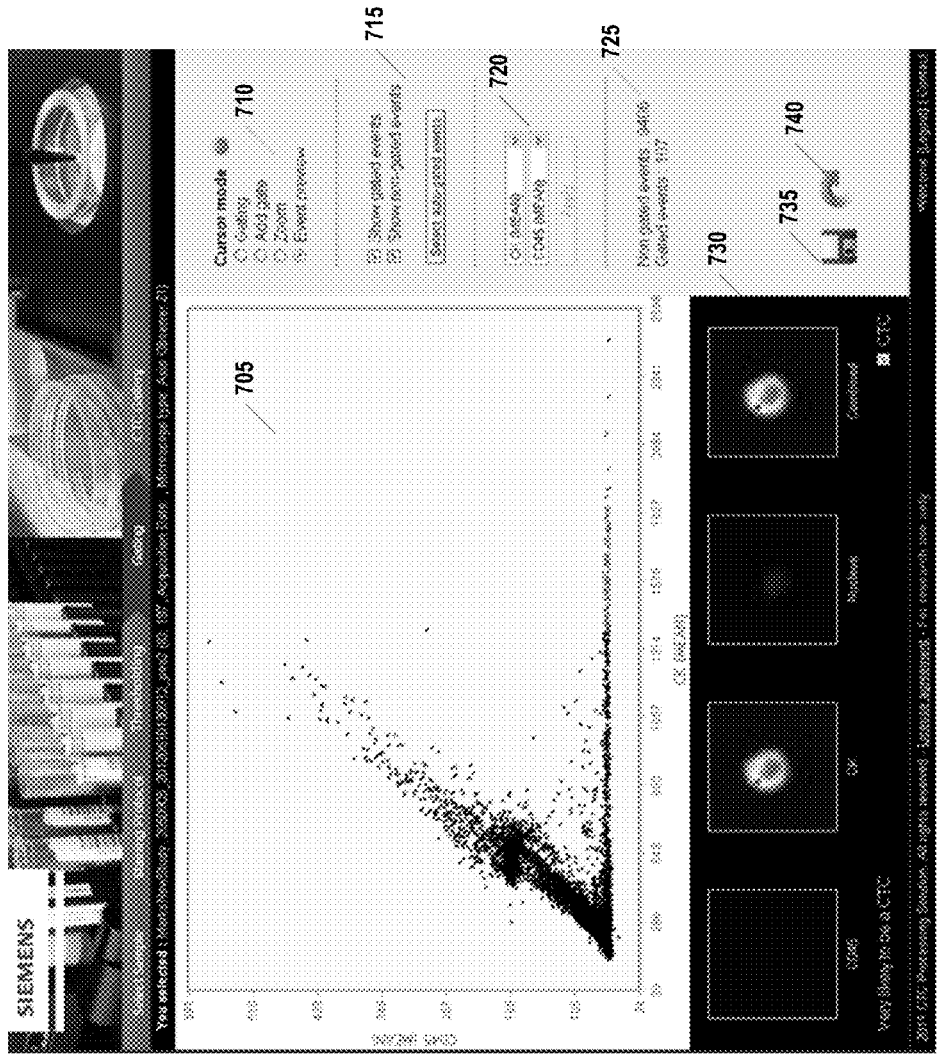
FIG. 7 provides an example interface for performing gating for an image based on the initial cell detection, as used in some embodiments of the present invention.

FIG. 7 provides an example interface 700 for performing gating for an image based on the initial cell detection, as used in some embodiments of the present invention. This interface 700 may be used, for example, to implement 530 of FIG. 5. The interface 700 includes a plot 705 of various staining parameters for the image being analyzed. In FIG. 7, the mean value of CD45 is plotted versus the mean value for CK. The plot 705 may use color coding based on gating parameters (e.g., cell score). For example, in one embodiment, cells with a cell score greater than or equal to 2.5 are classified as likely or very likely to be a CTC and are highlighted in red. Other cells in the plot 705 may be shown with a different color (e.g., black).

Continuing with reference to FIG. 7, panel 730 provides the images associated with the sample being analyzed. In the example of FIG. 7, the panel provides the images where CD45 is applied, where CK is applied, where a nucleus stain (e.g., DAPI) is applied, and a combined image showing all the various stains applied. The interface 700 provides a series of radio buttons 710 allowing the user to select various modes for the cursor displayed. Each cursor mode provides different views of the displayed plot 705. In the example of FIG. 7, these modes include "Gating," "Add gate", "Zoom," and "Event preview." In other embodiments, other cursor modes may be available. A series of checkboxes 715 in the interface 700 allows the user to select whether gated events, non-gated events, or both are displayed. Dropdown lists 720 allow the user to select the values displayed in the plot 705. For example, in FIG. 7, the mean values for CK or CD45 are selected. As a result, the mean values for CK are displayed on the x-axis of the plot 705 and the mean values of CD45 are displayed on the y-axis. A label 725 provides the number of gated and non-gated events displayed in the plot 705. A save component 735 allows the user to save any modifications to the gating parameters. In some embodiments, the save component 735 also provides the user with the option to save an image (e.g., PNG file or GIF file) of the gating plot 705. Another component 740 is provided to allow the user to advance to the next step in the CTC configuration process (e.g., 535 in FIG. 5) without modifying the gating parameters or saving any corresponding information.

Figure 8:
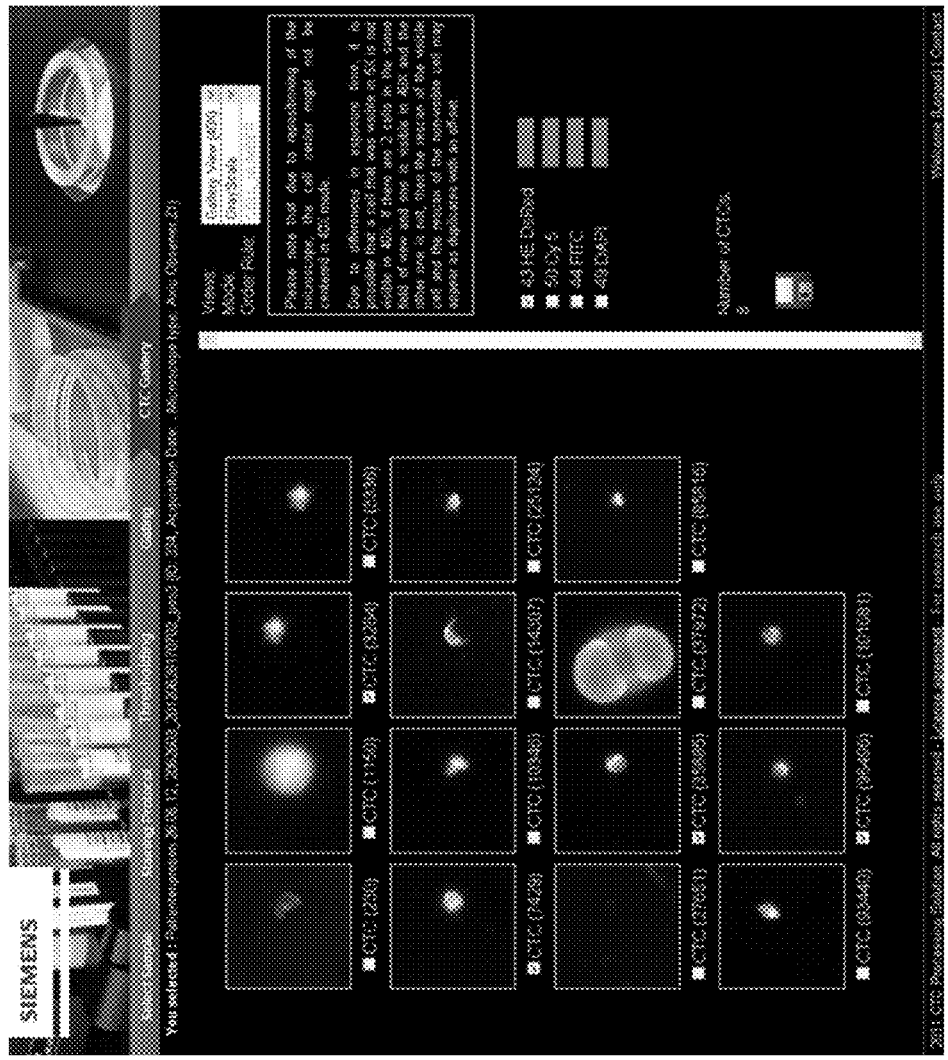
FIG. 8 provides an example interface for displaying a gallery of CTC images, as used by some embodiments of the present invention.

FIG. 8 provides an example interface 800 for displaying a gallery of CTC images, as used by some embodiments of the present invention. This interface 800 may be used, for example, to view and manually annotate CTCs. In the example of FIG. 8, a gray scale view is shown for illustration. However, in other embodiments, color coding may be used for showing the various staining applied to the acquired images. This color coding may be based, for example, on the various staining protocols associated with images. In one embodiment, each staining protocol is assigned a different color for presentation in the interface 800. The interface presents each image with a label (e.g., "CTC (230)") and a checkbox. The user may identify a CTC by selecting the checkbox corresponding to the image. Once the user has identified all CTCs in the gallery, the save component (illustrated as a small disk in the bottom right hand corner of the interface 800) allows the user to save the identifications and proceed to the next step of the CTC detection process. For example, in some embodiments, a user selection of the save component ends the process the of CTC detection. In other embodiments, selecting the save component causes a message to be sent to a microscope requesting higher resolution images of selected regions be acquired (see, e.g., FIG. 5).

Figure 9:
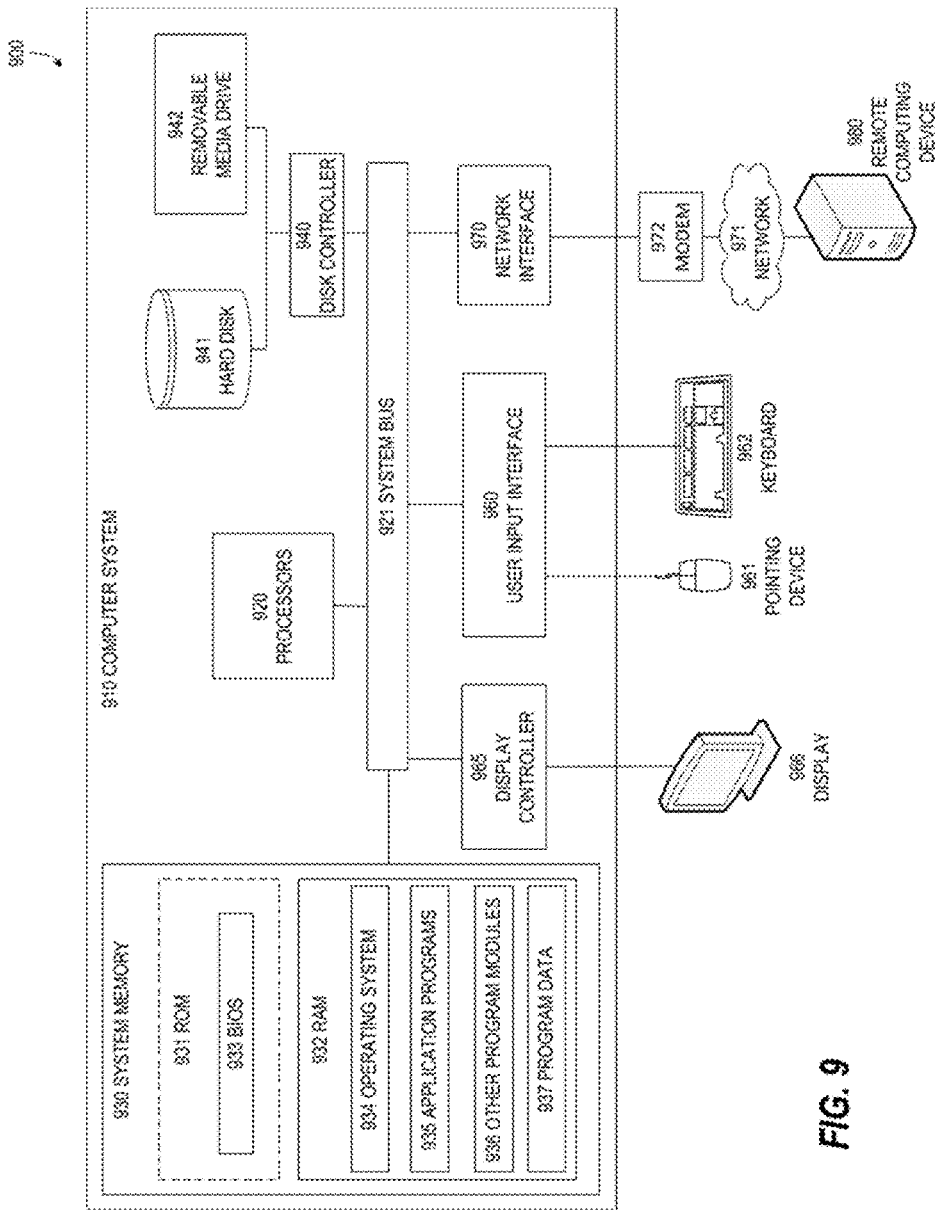
FIG. 9 illustrates an example computing environment within which embodiments of the invention may be implemented.

FIG. 9 illustrates an example computing environment 900 within which embodiments of the invention may be implemented. Computing environment 900 may include computer system 910, which is one example of a computing system upon which embodiments of the invention may be implemented. For example, with reference to FIG. 1, the computing environment 900 may be used to implement components of the CTC Detection System 105, the Microscope System 110, and/or the User Computer 120. Computers and computing environments, such as computer 910 and computing environment 900, are known to those of skill in the art and thus are described briefly here.

As shown in FIG. 9, the computer system 910 may include a communication mechanism such as a bus 921 or other communication mechanism for communicating information within the computer system 910. The system 910 further includes one or more processors 920 coupled with the bus 921 for processing the information.

The processors 920 may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Continuing with reference to FIG. 9, the computer system 910 also includes a system memory 930 coupled to the bus 921 for storing information and instructions to be executed by processors 920. The system memory 930 may include computer readable storage media in the form of volatile and/or nonvolatile memory, such as read only memory (ROM) 931 and/or random access memory (RAM) 932. The system memory RAM 932 may include other dynamic storage device(s) (e.g., dynamic RAM, static RAM, and synchronous DRAM). The system memory ROM 931 may include other static storage device(s) (e.g., programmable ROM, erasable PROM, and electrically erasable PROM). In addition, the system memory 930 may be used for storing temporary variables or other intermediate information during the execution of instructions by the processors 920. A basic input/output system 933 (BIOS) containing the basic routines that help to transfer information between elements within computer system 910, such as during start-up, may be stored in ROM 931. RAM 932 may contain data and/or program modules that are immediately accessible to and/or presently being operated on by the processors 920. System memory 930 may additionally include, for example, operating system 934, application programs 935, other program modules 936 and program data 937.

The computer system 910 also includes a disk controller 940 coupled to the bus 921 to control one or more storage devices for storing information and instructions, such as a magnetic hard disk 941 and a removable media drive 942 (e.g., floppy disk drive, compact disc drive, tape drive, and/or solid state drive). The storage devices may be added to the computer system 910 using an appropriate device interface (e.g., a small computer system interface (SCSI), integrated device electronics (IDE), Universal Serial Bus (USB), or FireWire).

The computer system 910 may also include a display controller 965 coupled to the bus 921 to control a display or monitor 965, such as a cathode ray tube (CRT) or liquid crystal display (LCD), for displaying information to a computer user. The computer system includes an input interface 960 and one or more input devices, such as a keyboard 961 and a pointing device 962, for interacting with a computer user and providing information to the processor 920. The pointing device 962, for example, may be a mouse, a light pen, a trackball, or a pointing stick for communicating direction information and command selections to the processor 920 and for controlling cursor movement on the display 966. The display 966 may provide a touch screen interface which allows input to supplement or replace the communication of direction information and command selections by the pointing device 961.

The computer system 910 may perform a portion or all of the processing steps of embodiments of the invention in response to the processors 920 executing one or more sequences of one or more instructions contained in a memory, such as the system memory 930. Such instructions may be read into the system memory 930 from another computer readable medium, such as a hard disk 941 or a removable media drive 942. The hard disk 941 may contain one or more datastores and data files used by embodiments of the present invention. Datastore contents and data files may be encrypted to improve security. The processors 920 may also be employed in a multi-processing arrangement to execute the one or more sequences of instructions contained in system memory 930. In alternative embodiments, hard-wired circuitry may be used in place of or in combination with software instructions. Thus, embodiments are not limited to any specific combination of hardware circuitry and software.

As stated above, the computer system 910 may include at least one computer readable medium or memory for holding instructions programmed according embodiments of the invention and for containing data structures, tables, records, or other data described herein. The term "computer readable medium" as used herein refers to any medium that participates in providing instructions to the processor 920 for execution. A computer readable medium may take many forms including, but not limited to, non-volatile media, volatile media, and transmission media. Non-limiting examples of non-volatile media include optical disks, solid state drives, magnetic disks, and magneto-optical disks, such as hard disk 941 or removable media drive 942. Non-limiting examples of volatile media include dynamic memory, such as system memory 930. Non-limiting examples of transmission media include coaxial cables, copper wire, and fiber optics, including the wires that make up the bus 921. Transmission media may also take the form of acoustic or light waves, such as those generated during radio wave and infrared data communications.

The computing environment 900 may further include the computer system 920 operating in a networked environment using logical connections to one or more remote computers, such as remote computer 980. Remote computer 980 may be a personal computer (laptop or desktop), a mobile device, a server, a router, a network PC, a peer device or other common network node, and typically includes many or all of the elements described above relative to computer 910. When used in a networking environment, computer 910 may include modem 972 for establishing communications over a network 971, such as the Internet. Modem 972 may be connected to system bus 921 via user network interface 970, or via another appropriate mechanism.

Network 971 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 910 and other computers (e.g., remote computing system 980). The network 971 may be wired, wireless or a combination thereof. Wired connections may be implemented using Ethernet, Universal Serial Bus (USB), RJ-6 or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 971.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the UI display images in response to signals received from the input devices.

In this way, the user interacts with the display image using the input devices, enabling user interaction with the processor or other device.

The functions and process steps herein may be performed automatically or wholly or partially in response to user command. An activity (including a step) performed automatically is performed in response to executable instruction or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network linking, for example, the units of FIGS. 1 and 9. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

We claim:

1. An automated method for detecting circulating tumor cells in a microscopic image of a blood sample, the method comprising:
   receiving, by a computer, a plurality of low-resolution images, each low resolution image providing a representation of the blood sample with one of a plurality of stains applied;
   determining, by the computer, a threshold value for each of the plurality of stains based on the low resolution images;
   identifying, by the computer, a list of potential circulating tumor cells based on the threshold values;
   performing, by the computer, a gating process on the list of potential circulating tumor cells to identify one or more likely or highly likely circulating tumor cells, the gating process further comprising:
      i) determining a circularity value for each potential circulating tumor cell;
      ii) for each potential circulating tumor cell, determining a median response for each of the plurality of staining channels;
      iii) determining a score for each potential circulating tumor cell based on its respective circularity value and respective median responses for each of the plurality of stains;
      iv) identifying the one or more likely or highly likely circulating tumor cells from the potential circulating tumor cells based the determined scores; and
   presenting, by the computer, the subset of the low-resolution images in a verification interface comprising one or more components allowing a user to confirm that a respective low-resolution image included in the subset of the low-resolution images includes one or more circulating tumor cells.

2. The method of claim 1, further comprising:
   identifying, by the computer, user-confirmed low-resolution images via the verification interface;
   transferring, by the computer, coordinates associated with the user-confirmed low-resolution images to a microscope;
   receiving, by the computer, one or more high resolution images acquired at the coordinates; and
   presenting, by the computer, the high resolution images in a new verification interface.

3. The method of claim 2, wherein the new verification interface comprises one or more new components allowing the user to confirm that a respective high-resolution image included in the presented high-resolution images includes one or more circulating tumor cells.

4. The method of claim 1, wherein receiving the plurality of low-resolution images comprises:
   receiving, by the computer, low-resolution image tiles from a microscope, each low-resolution image tile providing a tile representation of the blood sample with one of the plurality of stains applied; and
   combining, by the computer, the plurality of low resolution image tiles to create the plurality of low resolution images.

5. The method of claim 2, wherein receiving the one or more high-resolution images comprises:
   receiving, by the computer, high-resolution image tiles from the microscope, each high-resolution image tile providing a tile representation of the blood sample with one of the plurality of stains applied; and
   selecting, by the computer, a region of interest from each of the plurality of high-resolution image tiles based on the coordinates to create the plurality of high-resolution images.

6. The method of claim 1, wherein determining the threshold value for each of the plurality of stains based on the low resolution images comprises:
   creating a histogram of intensity values for each low resolution image; and
   automatically selecting pixels within a predetermined percentile of the histogram as thresholded values.

7. The method of claim 6, wherein the predetermined percentile is two percent.

8. The method of claim 6, further comprising:
   adjusting, by the computer, one or more of the thresholded values based on user input.

9. A system for detecting circulating tumor cells in a blood sample, the system comprising:
   a storage medium configured to store a plurality of low-resolution images, each low resolution image providing a representation of the blood sample with one of a plurality of stains applied;
   a detection processor operably coupled to the storage medium and configured to:
   determine a threshold value for each of the plurality of stains based on the low resolution images, identify a list of potential circulating tumor cells based on the threshold values, and perform a gating process on the list of potential circulating tumor cells to identify one or more likely or highly likely circulating tumor cells, the gating process further comprising:
      i) determining a circularity value for each potential circulating tumor cell;
      ii) for each potential circulating tumor cell, determining a median response for each of the plurality of staining channels;
      iii) determining a score for each potential circulating tumor cell based on its respective circularity value and respective median responses for each of the plurality of stains;

iv) identifying the one or more likely or highly likely circulating tumor cells from the potential circulating tumor cells based the determined scores; and a display configured to present a subset of the low-resolution images in a verification interface comprising one or more components allowing a user to confirm that a respective low-resolution image included in the subset of the low-resolution images includes one or more circulating tumor cells.

10. The system of claim 9, further comprising a microscope configured to acquire the plurality of low-resolution images.

11. The system of claim 10, wherein the detection processor is further configured to:

identify user-confirmed low-resolution images via the verification interface;

transfer coordinates associated with the user-confirmed low-resolution images to a microscope; and receive one or more high resolution images acquired at the coordinates.

12. The system of claim 11, wherein the display is further configured to present the high resolution images in a reconfirmation interface.

\* \* \* \* \*